United States Patent
Montalban

(10) Patent No.: US 6,390,620 B1
(45) Date of Patent: May 21, 2002

(54) HINGE WING WITH FLEXING DEVICE FOR TEMPLES OF EYEGLASSES

(75) Inventor: Rinaldo Montalban, Venice (IT)

(73) Assignee: Visottica S.p.A., Susegana (IT)

( * ) Notice: Subject to any disclaimer, the term of this patent is extended or adjusted under 35 U.S.C. 154(b) by 0 days.

(21) Appl. No.: 09/763,494

(22) PCT Filed: Jul. 10, 2000

(86) PCT No.: PCT/EP00/06538

§ 371 Date: Feb. 23, 2001

§ 102(e) Date: Feb. 23, 2001

(87) PCT Pub. No.: WO01/04689

PCT Pub. Date: Jan. 18, 2001

(30) Foreign Application Priority Data

Jul. 13, 1999 (IT) .......................................... PD99A0163

(51) Int. Cl.[7] ................................................. G02C 5/16
(52) U.S. Cl. ........................... 351/114; 351/153; 16/228
(58) Field of Search ................................. 351/113, 114, 351/121, 153; 16/228

(56) References Cited

U.S. PATENT DOCUMENTS

| | | | | |
|---|---|---|---|---|
| 4,991,258 A | * | 2/1991 | Drlik ............................ | 16/228 |
| 5,018,242 A | * | 5/1991 | Guy et al. ..................... | 16/228 |
| 5,483,302 A | * | 1/1996 | Jaffelin ........................ | 351/113 |
| 5,533,233 A | | 7/1996 | Reiner Wagner et al. ..... | 16/228 |

FOREIGN PATENT DOCUMENTS

| | | |
|---|---|---|
| DE | A-195 11 167 | 10/1996 |
| EP | A-0 340 161 | 11/1989 |
| FR | A-2 609 816 | 7/1988 |
| GB | A-2 268 282 | 1/1994 |
| WO | A-97 32234 | 9/1997 |
| WO | A-98 43127 | 10/1998 |

* cited by examiner

*Primary Examiner*—Huy Mai
(74) *Attorney, Agent, or Firm*—Guido Modiano; Albert Josif; Daniel O'Byrne

(57) ABSTRACT

A hinge wing (10) with flexing device for temples of eyeglasses, comprising a box-like element (11) which has, on the face (14) to be welded to the temple (12), an opening (24) for accessing its interior through which it is possible to insert, in a pre-assembled configuration, an elastic element (19) and the portion (16) of a male hinge element (17). The male element (17) is stably retained, with its corresponding portion (16), inside the box-like element (11) exclusively by a radially deformable open elastic ring (26) which is interposed, on the tip (18), between the elastic element (19) and the portion (16) that is coupled by side-fit mating to the box-like element (11); the ring (26) is inserted in an adapted slot (27) of the box-like element (11) whose perimetric dimensions are smaller than the dimensions of the ring at rest, and the ring is retained axially in the slot by its outer edge and radially by the pressure applied by its deformation produced by insertion.

4 Claims, 1 Drawing Sheet

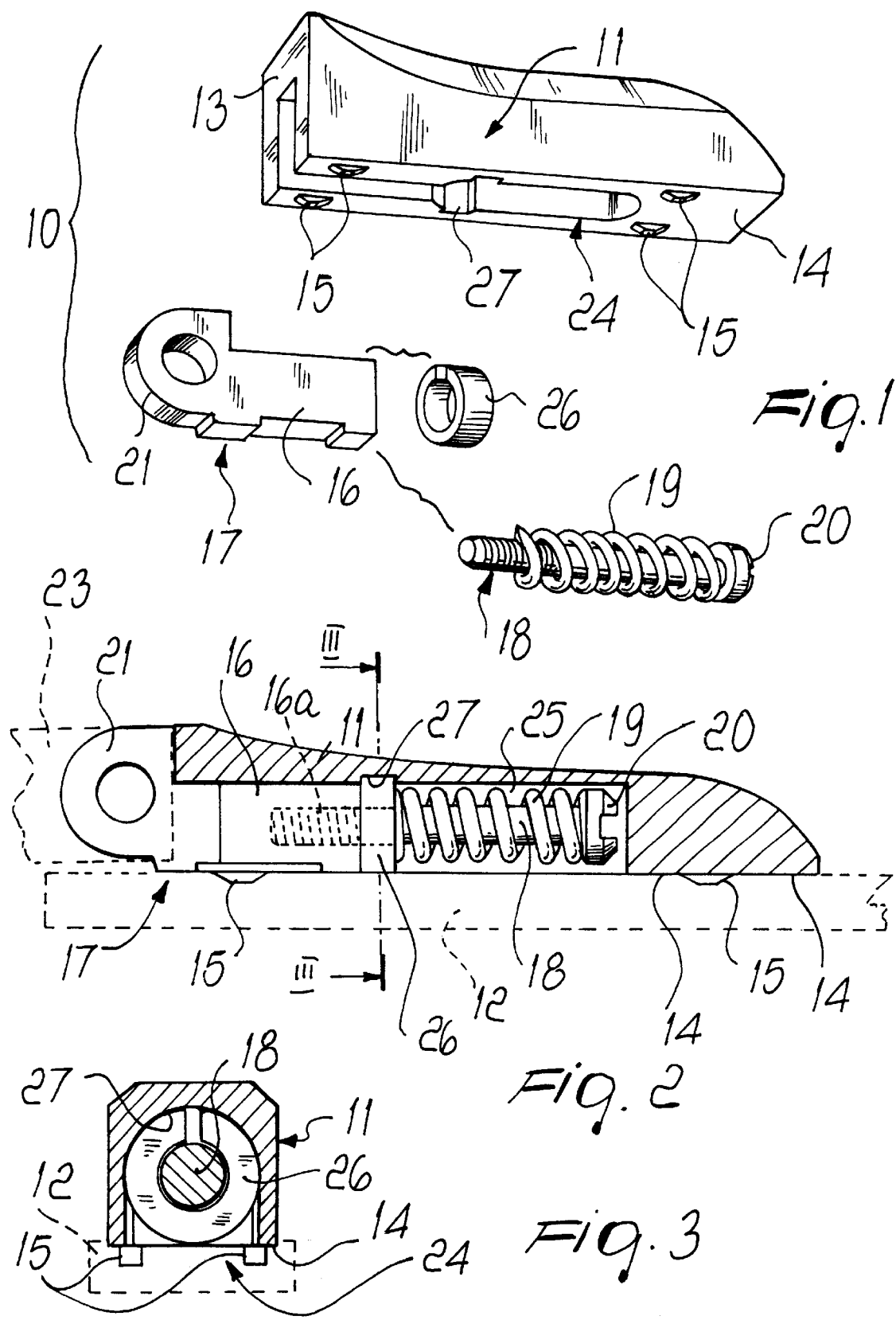

HINGE WING WITH FLEXING DEVICE FOR TEMPLES OF EYEGLASSES

BACKGROUND OF THE INVENTION

The present invention relates to a hinge wing with flexing device for temples of eyeglasses.

Currently, hinge wings are commonly commercially available which are each constituted by a box-like element to be fixed to a temple proximate to the end to be hinged to the front of the eyeglasses; a portion of a male hinge element is rigidly coupled inside the box-like element so that it can only slide axially and has a tip shaped like an axial pin surrounded by an elastic contrast means which acts by compression between a wider end of the tip and the box-like element.

Each one of the hinge wings is usually directly purchased by a user who, after welding the box-like element to the temple, completes the production of the frame of the eyeglasses by pivoting the part of the male element that protrudes from the box-like element to a corresponding female hinge element which is associated with the front.

The elastic articulation of the temple with respect to the front is therefore the result of the pivoting between the male element, in contrast with the elastic element, and the female element.

In this manner, each hinge wing can be welded to a plurality of temples having different technical and aesthetic characteristics, without altering the configuration of the articulation of the hinge.

In this regard, it should be noted that for the end buyer the greatest advantage that such hinge wings can ensure arises if the flexing device is already pre-assembled inside each box-like element, so that the user can simply weld the box-like element to the temple.

Unfortunately, it must be noted that the use of welding with conventional methods, by adding material and using a flame, entails an inevitable alteration of the elastic means that is pre-assembled in the box-like element.

The elastic element, being affected by the high temperatures reached during welding, is in fact annealed, so that its technical characteristics and elastic properties are altered.

For this reason, hinge wings constituted by a box-like element to be welded electrically to the temple by projection welding are becoming commercially widespread.

In this case, points of excess material in fact protrude from the face of the box-like element to be welded to the temple, and an opening is formed between said points; the male hinge element and the elastic element that constitute the flexing device can be inserted through the opening.

The male hinge element and the elastic element, however, do not remain locked inside the box-like element, and this entails first of all storage problems, while at the time of use it is necessary, by employing particular skill, to be able to combine the parts and keep them in the correct configuration inside the box-like element until welding to the temple is completed.

In order to facilitate the operation, devices have been devised which keep the parts assembled inside the box-like element, but a certain difficulty in assembly has still been noted for these devices, increasing production time.

SUMMARY OF THE INVENTION

The aim of the present invention is to provide a hinge wing with flexing device which is meant to be projection-welded to a temple of eyeglasses and solves the above-noted drawbacks for the assembly of the components.

Within the scope of this aim, an important object of the present invention is to provide a hinge wing which comprises a box-like element to be projection-welded and in which the flexing device is stably pre-assembled.

Another important object of the present invention is to provide a hinge wing for temples of eyeglasses having a very simple structural configuration.

Another object of the present invention is to provide, by means of the present invention, a hinge wing which allows to pre-assemble the flexing device inside it in a very simple manner.

Another important object of the present invention is to provide a hinge wing which is constituted by a box-like element comprising the flexing device, pre-assembled inside it, and in which no accidental escape of one or more components can occur.

Another object of the present invention is to provide a hinge wing which is meant to be projection-welded to temples of eyeglasses and can be obtained by means of processes and machines of a type per se known in the field.

Another object of the present invention is to provide a hinge wing with flexing device which can be obtained, in practice, with low costs.

This aim, these objects and others which will become better apparent hereinafter are achieved by a hinge wing with flexing device for temples of eyeglasses, comprising a box-like element, to be projection-welded to a temple, inside which a portion of a male hinge element is rigidly coupled so that it can only slide axially, said male hinge element having a tip which is shaped like an axial pin surrounded by an elastic contrast means which acts by compression between a wider end of said tip and said box-like element, a portion of the male element protruding from the front of the box-like element for pivoting to a corresponding female element so as to form the articulation, said box-like element having, on the face to be welded to the temple, an opening for accessing its interior through which it is possible to insert, in a pre-assembled configuration, said elastic means and said portion of said male hinge element, characterized in that said male element is stably retained, with its corresponding portion, inside the box-like element exclusively by means of a radially deformable open elastic ring which is interposed, on said tip, between said elastic means and said portion of said male element that is coupled by side-fit mating to said box-like element, said ring being inserted in an adapted slot of said box-like element whose perimetric dimensions are smaller than the dimensions of said ring at rest, said ring being retained axially in said slot by its outer edge and radially by the pressure applied by its deformation produced by insertion.

BRIEF DESCRIPTION OF THE DRAWINGS

Further characteristics and advantages of the present invention will become better apparent from the following detailed description of some embodiments thereof, illustrated only by way of non-limitative example in the accompanying drawings, wherein:

FIG. 1 is a perspective exploded view of a hinge wing with flexing device according to the invention;

FIG. 2 is a sectional view, taken along a longitudinal plane, of the hinge wing of FIG. 1, in an assembled condition;

FIG. 3 is a sectional view, taken along the line III—III of FIG. 2.

DESCRIPTION OF THE PREFERRED EMBODIMENTS

With reference to FIGS. 1 to 3, a hinge wing with flexing device for temples of eyeglasses is generally designated by the reference numeral 10 and comprises an elongated box-like element 11 which is substantially shaped like a parallelepiped and is adapted to be projection-welded at one face, as clarified hereinafter, to a temple 12 of a pair of eyeglasses, not shown in the above figures for the sake of simplicity.

In particular, the box-like element 11 has, on a side directed toward the end of the temple 12 to be articulated to the remaining part of the frame, a flat front 13.

In this case, the face of the box-like element 11 to be welded to the temple is the lower face 14, from which a point 15 of excess material protrudes at each corner region.

A portion 16 of a male hinge element 17 is rigidly coupled inside the box-like element 11, so that it can only slide axially due to side-fit mating, and has a tip 18 shaped like an axial pin surrounded by an elastic contrast means, which in this case is constituted by a helical spring 19.

The spring 19 acts by compression between a wider end 20 of the tip 18 and the box-like element 11.

The tip 18 is formed by a screw which is screwed into a corresponding hole 16a of the portion 16, and the wider end 20 is the head of the screw.

Another portion 21 of the male element 17 protrudes from an opening 22 of the front 13 of the box-like element 11 for pivoting to a corresponding female element, shown in dashed lines and designated by the reference numeral 23, so as to form the articulation.

As shown in FIG. 2, the portion 21 does not rest on the front 13 of the box-like element 11 neither when it is at rest nor in the active condition; a gap, measuring for example $\frac{1}{10}^{th}$ of a millimeter, is instead conveniently left between portion 21 and the front 13.

The box-like element 11 has, on the face 14 to be welded to the temple 12, an opening 24 for accessing its interior; the spring 19 and the portion 16 of the male hinge element 17 can be inserted through the opening in a pre-assembled condition.

In this case, the inside 25 of the box-like element 11 forms a longitudinally elongated space which is obtained for example by milling, particularly by using a cylindrical milling tool.

According to the invention, the male element 17 is stably retained, by means of its corresponding portion 16, inside the box-like element 11 exclusively by means of an open elastic ring 26 which is radially deformable and is interposed, on the tip 18, between the spring 19 (which rests thereon on the opposite side with respect to said wider end 20) and the portion 16.

The ring 26 is in fact inserted in an appropriately provided slot 27 of the box-like element 11, whose perimetric dimensions are smaller than the dimensions at rest of the ring, and is retained therein axially by means of its outer edge and radially by the pressure applied by its deformation produced by insertion.

In its slot 27, the ring 26 remains in a compressed state and is forced to assume a diameter which is smaller than its diameter at rest.

The action of the spring 19 on the box-like element 11 therefore occurs by means of the contact of both with the ring 26.

The ring, as well as the corresponding slot 27, can of course be circular, as shown in the figures, or have another adapted shape.

As regards assembly, the tip is inserted in succession in the spring 19 and in the ring 26, and is then screwed to the male element 17, so that the spring 19 is pre-loaded and therefore applies pressure to the ring 26.

The assembly is then stably inserted in the box-like element 11, arranging the ring 26 in the slot 27 and constricting it diametrically.

The only component of the assembly that is subjected to deformation during insertion in the box-like element 11 is the ring 26; however, the deformation is not in the expansion direction, but in the compression direction, inside the slot 27.

The hinge wing is therefore ready to be directly welded to a temple 12 or sold as a component for assembly.

In practice it has been observed that the present invention amply achieves the aim and all the objects.

In particular, a first aspect worth noting is linked to the fact that the described hinge wing can be projection-welded to temples of any kind very easily and practically, since the flexing device, whose parts have been stably assembled outside the box-like element, has already been stably pre-assembled inside the hinge wing.

Another aspect worth noting is related to the fact that the hinge wing according to the present invention has a very simple constructive structure which can be easily obtained by resorting to processes and machines which are conventional in the field.

The hinge wing described with the present invention is adapted to be projection-welded to temples of any kind, size, structure and quality.

The present invention is susceptible of numerous modifications and variations, all of which are within the scope of the same inventive concept.

All the details may be replaced with other technically equivalent elements.

The materials used, so long as they are compatible with the contingent use, as well as the dimensions, may be any according to requirements.

The disclosures in Italian Patent Application No. PD99A000163 from which this application claims priority are incorporated herein by reference.

What is claimed is:

1. A hinge wing with flexing device for temples of eyeglasses, comprising a box-like element, to be projection-welded to a temple, inside which a portion of a male hinge element is rigidly coupled so that it can only slide axially, said male hinge element having a tip which is shaped like an axial pin surrounded by an elastic contrast means which acts by compression between a wider end of said tip and said box-like element, a portion of the male element protruding from the front of the box-like element for pivoting to a corresponding female element so as to form the articulation, said box-like element having, on the face to be welded to the temple, an opening for accessing its interior through which it is possible to insert, in a pre-assembled configuration, said elastic means and said portion of said male hinge element, wherein said male element is stably retained, with its corresponding portion, inside the box-like element exclusively by means of a radially deformable open elastic ring which is interposed, on said tip, between said elastic means and said portion of said male element that is coupled by side-fit mating to said box-like element, said ring being inserted in an adapted slot of said box-like element whose perimetric dimensions are smaller than the dimensions of said ring at rest, said ring being retained axially in said slot by its outer edge and radially by the pressure applied by its deformation produced by insertion.

2. The hinge wing according to claim 1, wherein said box-like element is longitudinally elongated and substantially shaped like a parallelepiped and has, on the side directed toward the end of the temple to be articulated to the remaining part of the frame, a flat front from which said male element protrudes.

3. The hinge wing according to claim 2, characterized in that the face of said box-like element to be welded to the temple is perpendicular to said flat front, a point of excess material protruding from said face at each corner region.

4. The hinge wing according to claim 1, wherein said male element, said ring, said elastic means and said tip are mutually assembled separately from said box-like element.

* * * * *